E. E. A. MacNAUGHTON.
EGG CUP.
APPLICATION FILED MAR. 17, 1910.

971,910.

Patented Oct. 4, 1910.

Witnesses.
George A. Neubauer
Ernest M. Hill

Inventor.
Eliza Estelle Amanda Mac Naughton
By
Attorney.

UNITED STATES PATENT OFFICE.

ELIZA ESTELLE AMANDA MacNAUGHTON, OF YONKERS, NEW YORK.

EGG-CUP.

971,910.  Specification of Letters Patent.  Patented Oct. 4, 1910.

Application filed March 17, 1910. Serial No. 550,020.

*To all whom it may concern:*

Be it known that I, ELIZA ESTELLE AMANDA MACNAUGHTON, a citizen of the United States, residing at Yonkers, in the county of Westchester and State of New York, have invented a certain new and useful Improvement in Egg-Cups, of which the following is a specification.

This invention relates to improvements in receptacles for eggs and other articles and primarily to that class in which a mechanism for cracking the shell of the egg, and separating the same to expose the edible contents is combined with the holding cup.

The principal objects of the invention are to provide means for supporting the egg, for breaking the shell of the same and for lifting the upper portion of the egg from the lower portion after the shell is broken.

The invention also relates to certain details of construction which will be hereinafter described and claimed, reference being had to the accompanying drawings in which a preferred adaptation of the invention is shown.

Figure 1:
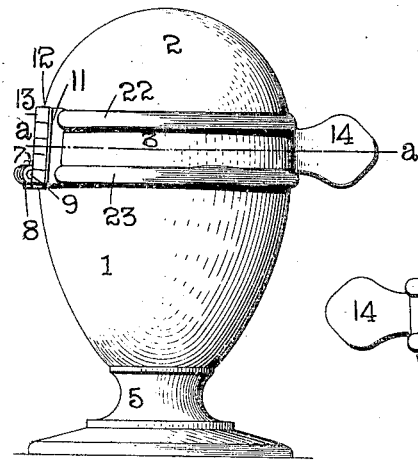
Figure 2:
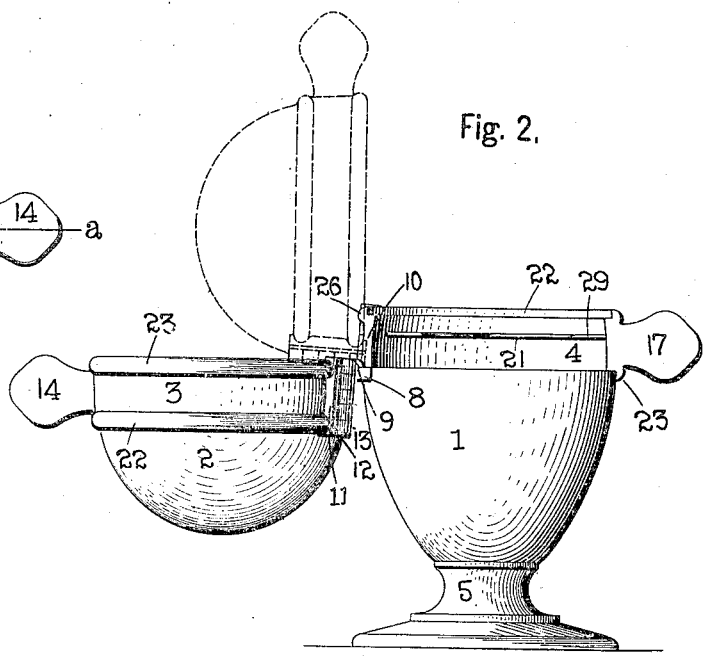
Figure 4:
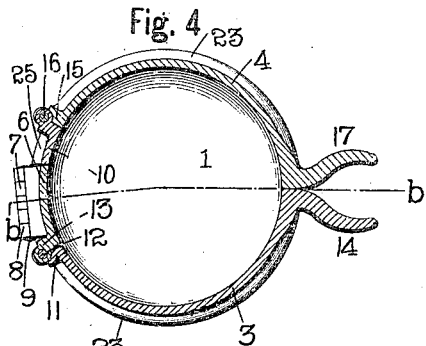
Figure 5:
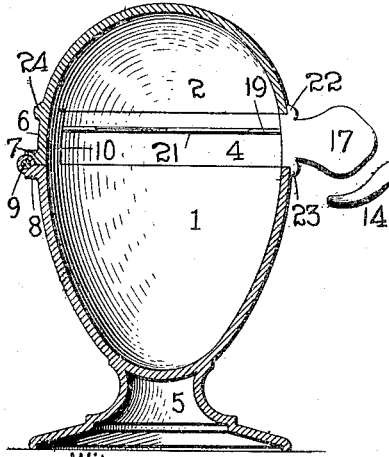
Figure 3:
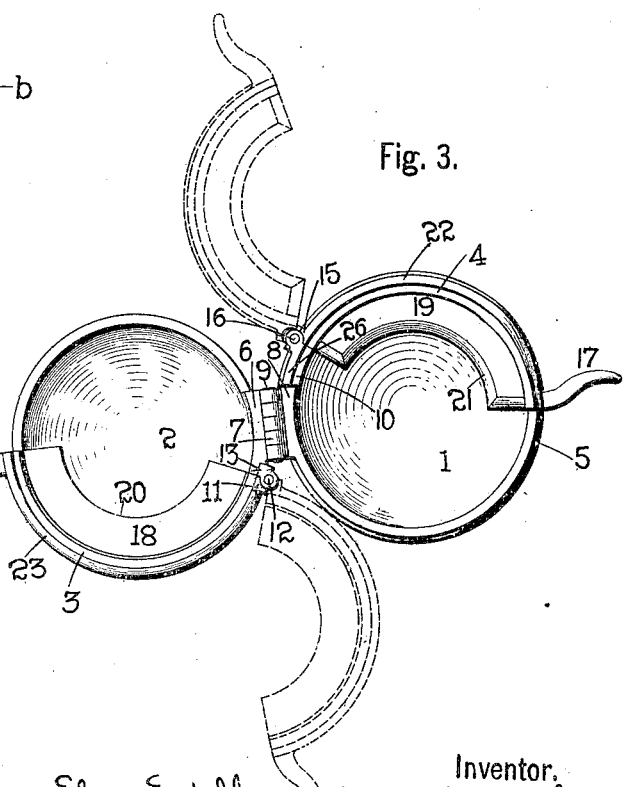

Figure 1 is a side elevation of the improved receptacle showing it in closed position. Fig. 2 is a similar view showing it open. Fig. 3 is a plan view of the receptacle as shown in Fig. 2. Fig. 4 is a horizontal section on line a—a— Fig. 1. Fig. 5 is a vertical central section on line b—b— Fig. 4.

In referring to the drawings in detail, like numerals designate like parts.

The adaptation of the invention shown in the drawings consists of a lower member 1, an upper member 2, and two curved segmental members 3, and 4.

The lower member 1, is of a cup-like form being hollowed out to receive and support an egg or other object in a substantially upright position and is provided with a supporting base 5. The upper member 2, is also of a cup-like form, but is made shallow and shorter than the lower member 1, and a comparatively short and narrow portion 6, depends from the lower edge on one side thereof, and carries a hinge element 7, at its lower end, which is secured to a companion hinge element 8, extending from the upper edge of the lower member 1, by a hinge pintle 9. A portion 10, which is rigid with the lower member projects vertically up from the top edge of the lower member and is located on one side of, and immediately adjacent to the hinge element 8. This portion 10, is equal in length to, but preferably somewhat narrower than the depending portion 6, and is unconnected to the upper member 2.

The segmental members 3 and 4 are curved to correspond to the curvature of the enlarged opposed ends of the lower and upper members 1 and 2, and are made substantially as wide as the portions 6 and 10, are long, and of sufficient length to fill the intervening space between the lower and upper members when closed. In other words, the space between the upper and lower members of the receptacle is closed completely around the entire circumference, when the upper and lower members and the segmental members are in closed position, by a multi-part metal ring composed of the two portions 6 and 10, and the two segmental members 3 and 4.

The segmental member 3, is provided at one end with a hinge element 11, which is pivoted by a pintle 12, to a hinge element 13, located on the outer side of the portion 6, and at the opposite end with an outwardly extending finger grasping element 14. The other segmental member is likewise provided with a hinge element 15, at one end which is joined to a companion hinge element arranged on the outer side of the portion 10, by a pintle 16, and an outwardly extending finger grasping element 17, at its opposite end. Curved cutting blades 18 and 19, are attached to and extend inwardly from the inner surface of the segmental members, and are respectively provided with curved and sharpened inner edges 20 and 21, which serve to cut and separate the shell or covering of the egg or other article nearly around its circumference.

The two segmental members 3 and 4, are provided on their upper and lower side edges with lateral flanges 22 and 23, which lap over the edge of the lower and upper members 1 and 2, when the members of the receptacle are in closed position. The portion 6, is provided with a lateral flange 24, at its juncture with the upper member 2, and the portion 10, has a lateral flange 25, at its juncture with the lower member 1, and a lateral flange 26, on its upper edge. These flanges when the segmental members are in closed position, form two projecting bead-like elements, which extend outwardly from the receptacle and encircle the same horizontally in parallelism.

The operation of the device is as follows; the egg is placed in the hollow of the lower member 1, in a vertical position therein, or in other words, on one of its ends. The upper member 2, is now turned down on the upper portion of the egg, carrying with it the segmental member 3, which is hinged to the side of its depending portion 6, and arranging the segmental members in position to be moved horizontally on their supporting hinges toward or from the shell of the egg. The operator now swings both of the segmental members on their hinges toward the egg and cuts or divides the egg shell horizontally for the greater portion of its circumference, severing the shell nearly into two portions. The only portion of the shell which is not divided is that directly within the portions 6 and 10. The egg and its shell may now be easily separated by turning the upper member 2, together with the segmental member 3, upwardly which, as the cutting blade is beneath the broken edges of the upper portion of the egg, lifts the upper portion of the egg and exposes the edible contents to view. The lifting of the upper portion of the egg usually cracks the uncut portion of the shell, as the lower portion is held stationary in the lower member 1, by the cutting blade of the segmental member 4, which projects above the broken or cut edge of the shell of the lower portion.

This improved receptacle may be altered, changed or modified in shape, arrangement or structure within the spirit and scope of the following claims, and may be utilized as a holder for other articles besides eggs.

I claim.

1. A receptacle of the class described comprising a lower cup member, an upper cup member arranged in opposed position with respect to the lower cup member and hinged to said lower cup member, and segmental members intermediate the upper and lower cup members and hinged respectively to the upper and lower cup members; said segmental members carrying cutting blades.

2. A receptacle of the class described comprising a lower cup member having an upwardly extending portion, an upper cup member having a depending portion hinged at its lower end to the lower member, and two curved segmental members one of which is hinged to the upwardly extending portion of the lower member and the other of which is hinged to the depending portion of the upper member; said segmental members carrying inwardly extending cutting blades.

3. A receptacle of the class described comprising two hinged members which are hollowed out and arranged in opposed position to inclose an article such as an egg, and two segmental cutting members; one of said cutting members being hinged to one of the hinged members, and the other cutting member being separately and independently hinged to the other hinged member; said segmental cutting members being constructed and arranged to cut the shell of the article by movement on their hinges toward each other, and to separate the upper and lower portions of the cut shell by movement in conjunction with the separating movement of the hinged members.

4. In a device of the class described, the combination with two opposed cup members hinged to each other on one side and adapted to inclose an article, of two segmental cutting members arranged intermediate of the cup members and adapted to extend nearly around the circumference of the receptacle when closed; one of said segmental cutting members being hinged to one cup member and the other segmental cutting member being separately and independently hinged to the other cup member, and said segmental cutting members being constructed and arranged to have movement with the cup members independent of, and at an angle to their cutting movement.

5. A receptacle of the class described comprising a lower cup member, an upper cup member arranged in inverted position on the lower cup member and movable relatively to open and close the receptacle, said upper and lower cup members when closed having an intervening space between them, and segmental cutting members arranged between the upper and lower cup members, one segmental cutting member being attached to the upper cup member and the other segmental cutting member being independently and separately attached to the lower cup member, said segmental cutting members being adapted to serve both as cutting devices and separating devices, and also to close the intervening space between the cup members.

6. A receptacle of the class described comprising a lower cup member, an upper cup member arranged in inverted position on the lower cup member and movable relatively to open and close the receptacle, said upper and lower cup members when closed having an intervening space between them, and segmental cutting members arranged between the upper and lower cup members and adapted to serve as cutting devices and also to close the intervening space between the two cup members.

ELIZA ESTELLE AMANDA
     MacNAUGHTON. [L. S.]

Witnesses:
 EDWIN J. DRYER,
 ROBT. G. SCHMIDT.